United States Patent [19]

Reunamaki

[11] Patent Number: 5,085,580
[45] Date of Patent: Feb. 4, 1992

[54] PREHEATER FOR FLAT GLASS SHEETS

[75] Inventor: Pauli T. Reunamaki, Tampere, Finland

[73] Assignee: Glasstech, Inc., Perrysburg, Ohio

[21] Appl. No.: 621,028

[22] Filed: Nov. 30, 1990

[51] Int. Cl.⁵ .............................................. F27B 9/28
[52] U.S. Cl. ...................................... 432/59; 432/152; 432/8
[58] Field of Search ................... 432/8, 59, 130, 152, 432/185, 201; 48/38.1

[56] References Cited

U.S. PATENT DOCUMENTS

| | | | |
|---|---|---|---|
| 4,116,620 | 9/1978 | Stibbe | 432/59 |
| 4,484,889 | 11/1984 | Marchal et al. | 432/59 |
| 4,944,098 | 7/1990 | Hella et al. | 432/59 |
| 4,944,673 | 7/1990 | Jacobs et al. | 432/59 |
| 4,999,927 | 3/1991 | Dunst et al. | 432/59 |

Primary Examiner—Henry C. Yuen
Attorney, Agent, or Firm—Brooks & Kushman

[57] ABSTRACT

A preheater (12) preheating flat glass sheets prior to further heating to a higher temperature is disclosed as including a conveyor (18) and a pair of opposed forced convection heaters (20) that each include a plurality of elongated housings (22) having a baffle (30) that extends diagonally between the housing ends (26) and is spaced from outlets (28) of the housing to provide a mixing chamber (32) that results in mixing of hot gas supplied from opposite directions to plenum of the housing. This mixing provides a uniform flow of hot gas through the outlets (28) between the housing ends and thereby provides uniform preheating of the glass sheet over its entire extent.

10 Claims, 2 Drawing Sheets

PREHEATER FOR FLAT GLASS SHEETS

TECHNICAL FIELD

This invention relates to a preheater for preheating flat glass sheets prior to further heating to a higher temperature within a furnace in preparation for further processing such as bending and tempering or other similar processing.

BACKGROUND ART

Flat glass sheets are conventionally heated by a furnace within an insulated housing to a temperature between about 600° and 700° centigrade in preparation for further processing such as bending and tempering or other similar processing. Preheaters have also been previously utilized to provide preheating of glass sheets to a temperature on the order of about 250° to 350° centigrade prior to further heating within an insulated furnace. Such preheaters have previously been of the forced convection type for preheating the glass sheets by hot gas. One problem involved with forced convection preheating of hot glass sheets is providing uniformity of the gas flow that provides the preheating over the entire extent of the flat glass sheet being heated.

DISCLOSURE OF INVENTION

An object of the present invention is to provide an improved preheater for uniformly preheating flat glass sheets prior to further processing to a higher temperature within a furnace.

In carrying out the above object, the preheater for preheating flat glass sheets in accordance with the present invention includes a conveyor for conveying a flat glass sheet to be preheated in a direction of conveyance along a plane of conveyance and also includes a pair of opposed forced convection heaters each of which includes a plurality of elongated housings that extend transversely with respect to the plane of conveyance. Each elongated housing defines a plenum and has opposite ends through which hot gas is supplied from opposite directions into the plenum. Each elongated housing has an array of outlets that face the plane of conveyance to deliver the hot gas from the plenum to the conveyed flat glass sheet. Each elongated housing also includes an elongated baffle that extends diagonally within the plenum between the opposite ends of the housing. The baffle of each housing is spaced from the outlets of the housing such that the plenum has a mixing chamber where hot gas supplied from both directions mixes prior to flow through the outlets in a manner that provides uniform flow of hot gas through the outlets between the housing ends and hence provides uniform heating of the conveyed glass sheet over its entire extent.

In the preferred construction of the preheater for preheating flat glass sheets, the conveyor is embodied by a roller conveyor having horizontally extending rolls and the pair of opposed forced convection heaters are respectively located above and below the roller conveyor.

The preferred construction of the preheater also has each housing constructed to include a pair of elongated housing members that cooperatively define the plenum with the baffle of each housing mounted within the elongated housing members. Each baffle of the preferred construction has an elongated flanged side that is mounted within the elongated housing members of the associated housing, and each baffle also has another side that is spaced from the housing and the outlets thereof to define the mixing chamber within the plenum. The elongated housing members of each housing have flanges where the housing members are secured to each other.

In the preferred construction, each housing of each forced convection heater also includes oppositely inclined walls that define the outlets through which the hot glass is delivered to heat the flat glass sheet. The elongated housing members of each housing whose flanges are secured to each other has the oppositely inclined walls extending from the flanges thereof which are adjacent the mixing chamber.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
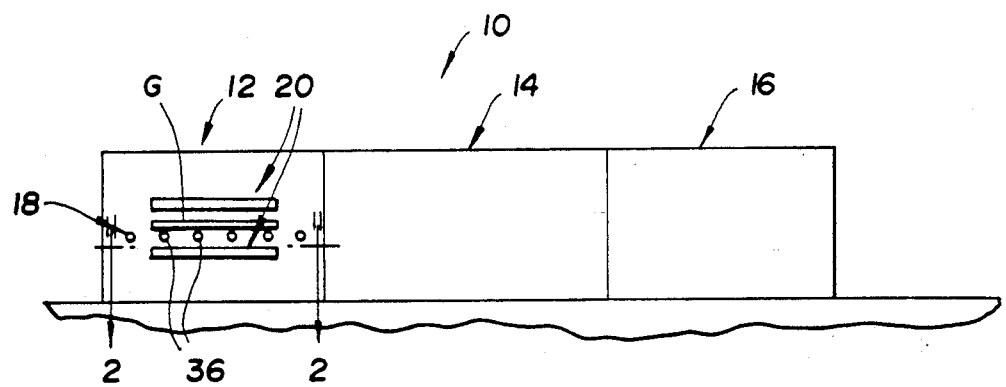
FIG. 1 is a schematic side elevational view of a glass sheet processing system including a preheater constructed in accordance with the present invention to preheat flat glass sheets prior to further heating to a higher temperature within a furnace.

With reference to FIG. 1 of the drawings, a glass sheet processing system indicated by 10 includes a preheater 12 that is constructed in accordance with the present invention to provide preheating of glass sheets to a temperature which is normally on the order of about 250° to 350° centigrade. System 10 also includes a furnace 14 for providing further heating of the preheated glass sheets to a temperature on the order of about 600° to 700° centigrade. A processing station 16 of the system 10 receives the heated glass sheets from the furnace 14 to provide processing thereof such as bending and tempering or other similar processing.

Figure 2:
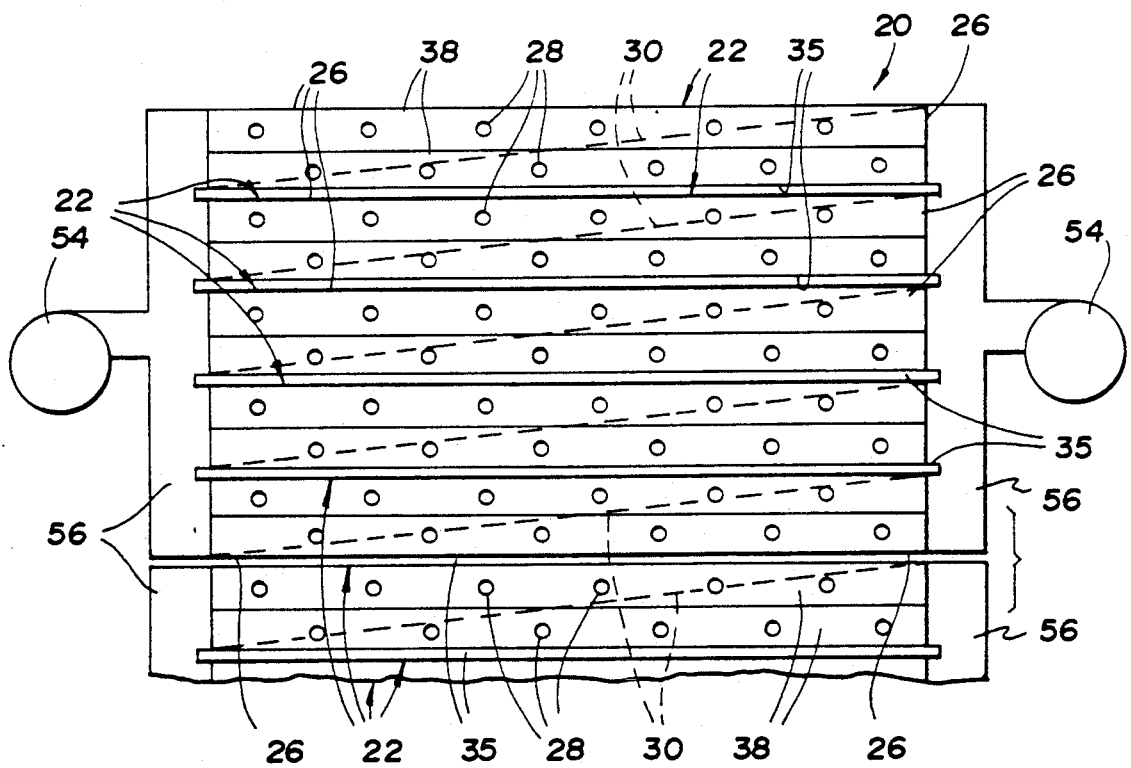
FIG. 2 is a top plan view illustrating the construction of a forced convection heater of the preheater and is taken along the direction of line 2—2 in FIG. 1.

As illustrated in FIG. 1, the preheater 12 of this invention is disclosed as including a conveyor 18 for conveying a flat glass sheet G to be preheated in a direction of conveyance along a plane of conveyance. A pair of opposed forced convection heaters 20 each include a plurality of elongated housings 22 as illustrated in FIG. 2. These elongated housings 22 extend transversely with respect to the direction of conveyance.

Figure 3:
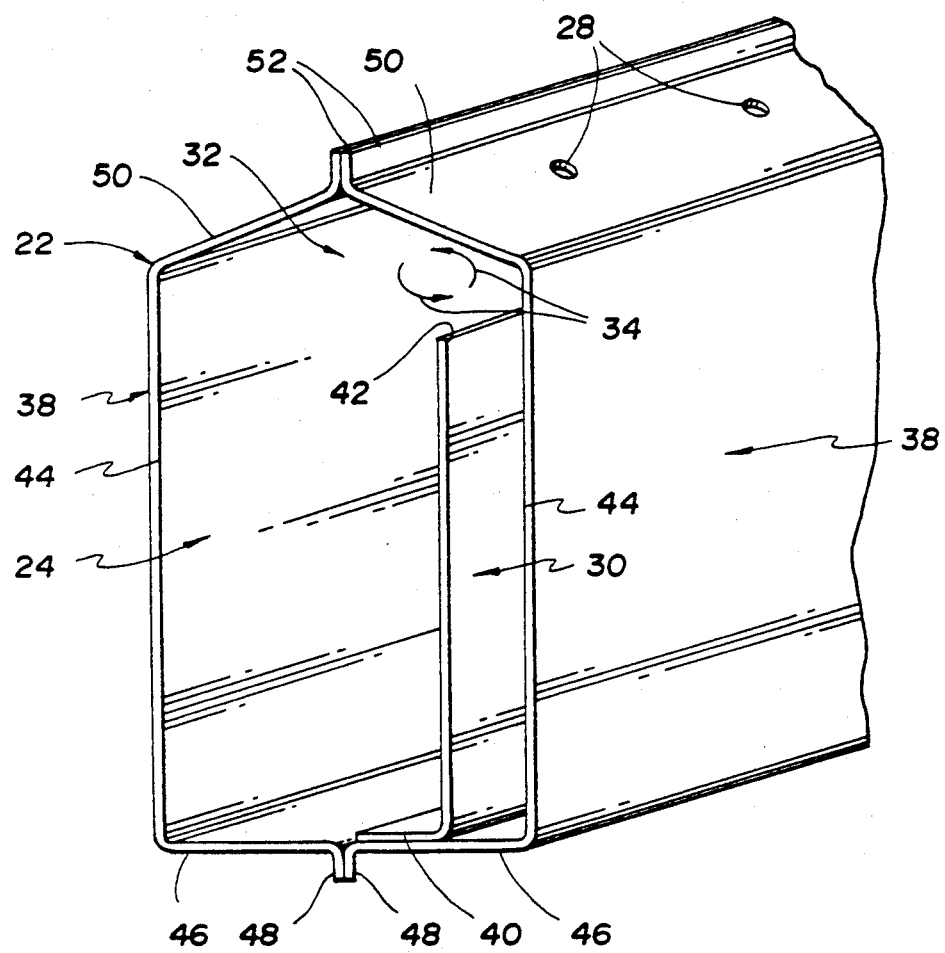
FIG. 3 is an end perspective view that illustrates the construction of the elongated housings of the forced convection preheaters.

As illustrated in FIG. 3, each elongated housing 22 defines an elongated plenum 24 and, as shown in FIG. 2, has opposite ends 26 through which hot gas is supplied from opposite directions into the plenum. Each elongated housing 22 has an array of outlets 28 that face the plane of conveyance to deliver the hot gas from the plenum to the conveyed flat glass sheet. Each elongated housing includes an elongated baffle 30 that extends diagonally within the plenum between the opposite ends 26 of the housing. Each baffle 30 as shown in FIG. 3 is spaced from the outlets 28 such that the plenum 24 has a mixing chamber 32 where the hot gas supplied from opposite directions mixes as shown by arrows 34 prior to flow through the outlets 28 in a manner that provides uniform flow of hot gas through the outlets between the housing ends. This construction of the preheater has been found to provide uniform heating of the conveyed glass sheet over its entire extent. Also, the housings 22 as shown in FIG. 2 are spaced from each other to define elongated exhaust areas 35 where the gas can escape after impingement with the glass sheet.

As illustrated in FIG. 1, the conveyor 18 of the preheater 12 is preferably a roller conveyor having horizontally extending rolls 36, and the pair of opposed forced convection heaters 20 are respectively located above and below the rolled conveyor and thus oppose each other along a horizontal plane. The conveyor rolls 36 are preferably made from steel so as to have sufficient strength such that a relatively small diameter can be used in order to reduce the interference of the gas flow by the rolls at the lower surface of the conveyed glass sheet.

As illustrated by combined reference to FIGS. 2 and 3, each housing 22 includes a pair of elongated housing members 38 that cooperatively define the plenum 24 with the baffle 30 of the housing mounted within the elongated housing members. Each baffle 30 as shown in FIG. 3 has an elongated flanged side 40 that is mounted such as by welding to the elongated housing members 38 of the associated housing 22. Each baffle has another side 42 that is spaced from the housing 22 and the outlets 28 thereof to define the mixing chamber 32 within the plenum where the mixing takes place of the hot gas supplied from opposite directions. Each housing member has a vertical wall 44, a horizontal wall 46 that extends from the vertical wall 44, a flange 48 that extends from the wall 46 and is secured in a suitable manner such as welding to the flange 48 of the other housing member, an inclined wall 50 that extends from the vertical wall 44 and defines the outlets 28 along the elongated housing, and a flange 52 that extends from the inclined wall 50 and is secured to the flange 52 of the other housing member in any suitable manner such as by welding. Thus, the inclined walls 50 extend from the flanges 52 and thereby face the plane of conveyance obliquely. This construction permits the locations of impingement to be more uniformly distributed despite the spacing of the preheater housings 22 from each other to provide the exhaust areas as previously described.

As shown in FIG. 2, each forced convection heater 20 has opposite lateral sides each of which includes at least one blower 54 and a manifold 56 that supplies hot gas from the associated blower to a plurality of the housing plenums in which the baffles 30 are located. As illustrated, each manifold 56 supplies hot gas to five of the housings 22 from the associated blower 56.

While the best mode for carrying out the invention has been described in detail, those familiar with the art to which this invention relates will recognize various alternative designs and embodiments for practicing the invention as defined by the following claims.

What is claimed is:

1. A preheater for preheating flat glass sheets prior to further heating to a higher temperature within a furnace, the preheater comprising:
   a conveyor for conveying a flat glass sheet to be preheated in a direction of conveyance along a plane of conveyance; and
   a pair of opposed forced convection heaters each of which includes a plurality of elongated housings that extend transversely with respect to the direction of conveyance, each elongated housing defining a plenum and having opposite ends through which hot gas is supplied from opposite directions into the plenum, each elongated housing having an array of outlets that face the plane of conveyance to deliver the hot gas from the plenum to the conveyed flat glass sheet, each elongated housing including an elongated baffle that extends diagonally within the plenum between the opposite ends of the housing, and each baffle being spaced from the outlets of the housing such that the plenum has a mixing chamber where the hot gas supplied from both directions mixes prior to flow through the outlets in a manner that provides uniform flow of hot gas through the outlets between the housing ends.

2. A preheater for preheating flat glass sheets as in claim 1 wherein the conveyor comprises a roller conveyor having horizontally extending rolls, and the pair of opposed forced convection heaters being . respectively located above and below the roller conveyor.

3. A preheater for preheating flat glass sheets as in claim 1 wherein each housing includes a pair of elongated housing members that cooperatively define the plenum, and the baffle of each housing being mounted between the elongated housing members.

4. A preheater for preheating flat glass sheets as in claim 3 wherein each baffle has an elongated flanged side that is mounted between the elongated housing members of the associated housing, and each baffle having another side that is spaced from the housing and the outlets thereof to define the mixing chamber within the plenum.

5. A preheater for preheating flat glass sheets as in claim 4 wherein the elongated housing members of each housing have flanges where the housing members are secured to each other, and the baffle having a flanged side that is mounted on the housing, within the plenum.

6. A preheater for preheating flat glass sheets as in claim 1 wherein each housing includes oppositely inclined walls that define the outlets through which the hot gas is delivered to heat the flat glass sheet.

7. A preheater for preheating flat glass sheets as in claim 1 wherein each housing includes a pair of elongated housing members having flanges secured to each other, and each housing having oppositely inclined walls that extend from flanges thereof and that define the outlets through which the hot gas is delivered to heat the flat glass sheet.

8. A preheater for preheating flat glass sheets as in claim 1 wherein each forced convection heater has opposite lateral sides each of which includes at least one blower and a manifold that supplies hot gas from the associated blower to a plurality of the housing plenums in which the baffles are located.

9. A preheater for preheating flat glass sheets prior to further heating to a higher temperature within a furnace, the preheater comprising:
   a roller conveyor including rolls for conveying a flat glass sheet to be preheated in a direction of conveyance along a plane of conveyance; and
   a pair of top and bottom forced convection heaters that are located above and below the roller conveyor in an opposed relationship to each other, each forced convection heater including a plurality of elongated housings that extend transversely with respect to the direction of conveyance, each elongated housing defining a plenum and having opposite ends through which hot gas is supplied from opposite directions into the plenum, each elongated housing having an array of outlets that face the plane of conveyance to deliver the hot gas from the plenum to the conveyed flat glass sheet, each elongated housing including an elongated baffle that extends diagonally within the plenum between the opposite ends of the housing, and each baffle being spaced from the outlets of the housing such that the plenum has a mixing chamber where the hot gas supplied from both directions mixes prior to flow through the outlets in a manner that provides uniform flow of hot gas through the outlets between the housing ends.

10. A preheater for preheating flat glass sheets prior to further heating to a higher temperature within a furnace, the preheater comprising:

a roller conveyor including rolls for conveying a flat glass sheet to be preheated in a direction of conveyance along a plane of conveyance; and a pair of top and bottom forced convection heaters that are located above and below the roller conveyor in an opposed relationship to each other, each forced convection heater including a plurality of elongated housings that extend transversely with respect to the direction of conveyance, each elongated housing including a pair of elongated housing members that define a plenum and each housing having opposite ends through which hot gas is supplied from opposite directions into the plenum, each elongated housing having an array of outlets that face the plane of conveyance to deliver the hot gas from the plenum to the conveyed flat glass sheet, each elongated housing including an elongated baffle that is mounted by the associated housing extending diagonally within the plenum between the opposite ends of the housing, each baffle having one flanged side mounted by the associated housing, and each baffle having another side spaced from the housing and the outlets thereof such that the plenum has a mixing chamber where the hot gas supplied from both directions mixes prior to flow through the outlets in a manner that provides uniform flow of hot gas through the outlets between the housing ends.

* * * * *